(12) United States Patent
Zhang et al.

(10) Patent No.: US 11,075,429 B2
(45) Date of Patent: *Jul. 27, 2021

(54) LOW ELECTRICAL RESISTANCE MICROPOROUS BATTERY SEPARATOR MEMBRANES, SEPARATORS, CELLS, BATTERIES, AND RELATED METHODS

(71) Applicant: Celgard, LLC, Charlotte, NC (US)

(72) Inventors: Xiaomin Zhang, Charlotte, NC (US); Lie Shi, Matthews, NC (US)

(73) Assignee: Celgard, LLC, Charlotte, NC (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/934,725

(22) Filed: Jul. 21, 2020

(65) Prior Publication Data
US 2020/0350543 A1 Nov. 5, 2020

Related U.S. Application Data (62) Division of application No. 16/378,841, filed on Apr. 9, 2019, now Pat. No. 10,720,623, which is a division of application No. 15/172,215, filed on Jun. 3, 2016, now Pat. No. 10,256,447.

(60) Provisional application No. 62/170,302, filed on Jun. 3, 2015.

(51) Int. Cl.
| | | |
|---|---|---|
| *H01M 50/411* | (2021.01) | |
| *B32B 27/08* | (2006.01) | |
| *B32B 27/32* | (2006.01) | |
| *B32B 3/26* | (2006.01) | |
| *H01M 50/403* | (2021.01) | |
| *H01M 50/449* | (2021.01) | |
| *H01M 10/0525* | (2010.01) | |

(52) U.S. Cl.
CPC ............ *H01M 50/411* (2021.01); *B32B 3/26* (2013.01); *B32B 27/08* (2013.01); *B32B 27/32* (2013.01); *H01M 50/403* (2021.01); *H01M 50/449* (2021.01); *B32B 2250/03* (2013.01); *B32B 2307/202* (2013.01); *B32B 2307/516* (2013.01); *B32B 2307/581* (2013.01); *B32B 2307/704* (2013.01); *B32B 2307/732* (2013.01); *B32B 2457/10* (2013.01); *H01M 10/0525* (2013.01)

(58) Field of Classification Search
CPC .. H01M 2/145; H01M 2/1653; H01M 2/1686; H01M 10/0525; B32B 3/26; B32B 27/08; B32B 27/32; B32B 2307/202; B32B 2307/516; B32B 2307/581; B32B 2307/704; B32B 2307/732; B32B 2457/10; B32B 2250/03
See application file for complete search history.

(56) References Cited

U.S. PATENT DOCUMENTS

| | | | |
|---|---|---|---|
| 4,097,383 A | 6/1978 | Ohtani | |
| 5,547,756 A | 8/1996 | Kamo et al. | |
| 5,691,077 A | 11/1997 | Yu | |
| 5,952,120 A | 9/1999 | Yu et al. | |
| 10,256,447 B2 * | 4/2019 | Zhang | .............. B32B 27/32 |
| 10,720,623 B2 * | 7/2020 | Zhang | .............. B32B 27/32 |
| 2007/0148538 A1 | 6/2007 | Call | |
| 2009/0225495 A1 | 9/2009 | Kang et al. | |
| 2010/0209758 A1 | 8/2010 | Call et al. | |
| 2011/0223486 A1 | 9/2011 | Zhang et al. | |
| 2012/0028092 A1 | 2/2012 | Nunome | |
| 2014/0079980 A1 | 3/2014 | Halmo et al. | |
| 2014/0272533 A1 | 9/2014 | Shi et al. | |
| 2014/0287322 A1 | 9/2014 | Wei et al. | |
| 2014/0302374 A1 | 10/2014 | Wei et al. | |

* cited by examiner

*Primary Examiner* — Anca Eoff
(74) *Attorney, Agent, or Firm* — Hammer & Associates, P.C.

(57) ABSTRACT

Improved microporous battery separator membranes, separators, cells, batteries including such membranes, separators, cells, and/or methods of making such membranes and/or separators, and/or methods of using such membranes and/or separators are provided. In accordance with at least certain embodiments, an improved battery separator for a secondary or rechargeable lithium battery may have low electrical resistance of less than 0.95 ohm-cm$^2$, or less than 0.8 ohm-cm$^2$. The inventive battery separator membrane may provide a means to achieve an improved level of battery performance in a rechargeable or secondary lithium battery based on a possibly synergistic combination of low electrical resistance, low Gurley, low tortuosity, and/or a unique trapezoid shaped pore. In accordance with at least certain multilayer embodiments (for example, a trilayer membrane made of two polypropylene layers with a polyethylene layer in between), the inventive microporous membrane or battery separator has excellent onset and rate of thermal shutdown performance.

13 Claims, 8 Drawing Sheets

| Approximate Pore Shape of Microporous Separator Membrane of Embodiments Herein | Approximate Pore Shape, CE1 | Approximate Pore Shape, CE3 |
|---|---|---|

LOW ELECTRICAL RESISTANCE MICROPOROUS BATTERY SEPARATOR MEMBRANES, SEPARATORS, CELLS, BATTERIES, AND RELATED METHODS

CROSS REFERENCE TO RELATED APPLICATIONS

This application is a divisional application of U.S. Pat. No. 16,378,841, filed Apr. 9, 2019 and issued as U.S. Pat. No. 10,720,623, which claims benefit to U.S. Divisional application Ser. No. 15/172,215, filed Jun. 3, 2016 and Issued as U.S. Pat. No. 10,256,447 on Apr. 9, 2019; which claims priority to and the benefit of U.S. provisional patent application Ser. No. 62/170,302 filed Jun. 3, 2015, incorporated herein by reference.

FIELD OF THE INVENTION

In accordance with at least selected embodiments, the present application is directed to novel or improved microporous battery separator membranes, separators, cells, or batteries including such membranes or separators, and/or methods including methods of making such membranes, separators, cells, and/or batteries, and/or methods of using such membranes, separators, cells, and/or batteries. In accordance with at least certain embodiments, the present invention is directed to a battery separator for a secondary or rechargeable lithium battery which may have low electrical resistance (ER) of less than 0.95 ohm-cm$^2$, in some cases, less than 0.8 ohm-cm$^2$. In accordance with at least certain embodiments, the battery separator membrane or separator may provide a means to achieve an improved level of battery performance in a rechargeable or secondary lithium battery based on a possibly synergistic combination of low electrical resistance, low Gurley, low tortuosity, and/or a unique shaped pore, which pore, in some cases, approximates the shape of a trapezoid or is trapezoid-like in shape. In accordance with at least certain multilayer embodiments (by way of example only, a trilayer membrane made of two polypropylene layers with a polyethylene layer in between), the microporous membrane or battery separator described herein may have excellent onset of thermal shutdown and/or excellent rate of thermal shutdown performance.

BACKGROUND OF THE INVENTION

U.S. Pat. Nos. 5,691,077 and 5,952,120 and U.S. Patent Publication No. 2007/0148538 disclose various methods for making dry process microporous battery separator membranes using uniaxial or machine direction (MD) stretching. The dry process (often referred to as the Celgard® process) may, in some instances, produce an elongated slit-shaped pore when using a uniaxial mode of stretching a nonporous, semi-crystalline, extruded polymer precursor. Battery separator membranes made using dry process uniaxial stretch methods may, in some instances, have a machine direction tensile strength higher than transverse directional tensile strength.

In order to increase the transverse directional tensile strength for various dry process porous separator membranes, U.S. Pat. No. 8,795,565 and U.S. Patent Publication Nos. 2011/0223486, 2014/0287322 and 2014/0302374 propose various methods including transverse direction (TD) stretching, performed simultaneously and/or sequentially with machine direction (MD) stretching (or uniaxial stretching).

U.S. Pat. No. 8,795,565 and U.S. Patent Publication Nos. 2014/0287322 and 2014/0302374 propose various transverse direction stretching methods which may include a simultaneous controlled machine direction relax step, a MD/TD stretch ratio of about 0.5 to about 4.0, and/or a MD tensile strength of up to about 1450 kg/cm$^2$. The unique stretching processes may, in some instances, result in a change in the shape of the pores from an elongated slit-shape pore that may be found with some dry process uniaxial stretching processes, to a more round-shape pore (or a substantially round-shaped pore). Pore size and shape may be, in some instances, important separator membrane performance properties because they may influence the migration of electrolyte and ions between the electrodes of a lithium ion rechargeable battery during the charge and discharge cycles. U.S. Patent Publication No. 2011/0223486 proposes, in various embodiments, an adjustment in the amount of MD and TD stretching where the MD/TD stretch ratio is approximately equal to one, in order to produce a porous membrane with balanced MD and TD tensile strength. And in various instances, ER values of known biaxial stretched dry process battery separator membranes may be greater than 1 ohm-cm$^2$.

SUMMARY OF THE INVENTION

The details of one or more embodiments are set forth in the descriptions below. Other features, objects, and advantages will be apparent from the description and from the claims.

The power performance of various lithium batteries, such as secondary or rechargeable lithium ion batteries, may be limited or influenced by the ER, the Gurley and/or the tortuosity of the battery separator used in such a battery. There is a need for a microporous separator membrane with very low ER, low Gurley and low tortuosity in order to increase the power, improve the rate performance, improve the cycling performance, improve the cycle life, and/or improve performance after a high number of charge/discharge cycles of a lithium ion rechargeable battery. In some instances, an improved separator having a very low ER, low Gurley, and low tortuosity may provide a separator having lower ionic resistance to the flow of electrolyte during battery cycling, which may contribute to various improvements in performance for a battery containing such an improved separator. Electric Drive Vehicles (EDVs) often require a high power performance battery. One method of achieving higher power performance in a lithium ion battery for EDV end use applications is to use a very low ER, microporous separator membrane with low Gurley and low tortuosity in a lithium ion rechargeable battery.

In accordance with at least selected embodiments, the present application or invention is directed to an improved or novel microporous battery separator membrane for a lithium rechargeable battery, such as a lithium ion battery, and various methods of making such separator membranes. The battery separator described herein can have a low electrical resistance (ER) of, in some instances, less than 0.95 ohm-cm$^2$, and in some cases, less than 0.8 ohm-cm$^2$, low Gurley, low tortuosity and a unique non-round shaped pore. The method of achieving low ER, low Gurley, low tortuosity and a non-round shaped pore (such as a pore whose shape approximates a trapezoid or is trapezoid-like) may be based on novel methods to control the pore size during machine direction and/or transverse directional stretching processes.

In accordance with at least selected embodiments, the present application or invention may address the above needs or demands and/or is directed to novel or improved separator membranes, separators, batteries including such separators, methods of making such membranes, separators and/or batteries, and/or methods of using such membranes, separators, and/or batteries. The instant invention relates to a new or improved microporous separator membrane for a lithium ion battery and methods of manufacture and use thereof. The possibly preferred inventive microporous separator membrane is stretched in a novel method which varies the mode of the uniaxial (machine) and transverse direction stretching process steps.

In addition, the nonporous precursor membrane is a highly crystalline. The highly crystalline nonporous precursor is initially machine direction stretched where the amount of MD stretching is conducted to produce a high percent transverse direction elongation (% TD elongation) "semi-porous intermediate" membrane. The initial MD stretching of a highly crystalline nonporous precursor produces a semi-porous intermediate with % TD Elongation that is, in some embodiments, greater than 600% and/or a puncture strength that is, in some embodiments, greater than 330 gf, in some embodiments, greater than 350 gf, which properties may be important in achieving the inventive low ER microporous separator membrane described in various embodiments herein. Table 1 lists various properties of the semi-porous intermediate membrane. The semi-porous intermediate is not a finished product, but is an intermediate membrane which has, in certain embodiments, a targeted puncture strength, and/or a targeted % TD elongation. In various embodiments, the semi-porous intermediate is next transverse directional stretched at a preferred temperature and speed where the TD stretching process is followed by a TD relax step performed preferably at 120 to 140° C. Table 4 lists the separator properties of the final MD and TD stretched microporous battery separator membranes made according to various embodiments described herein.

Figure 1:
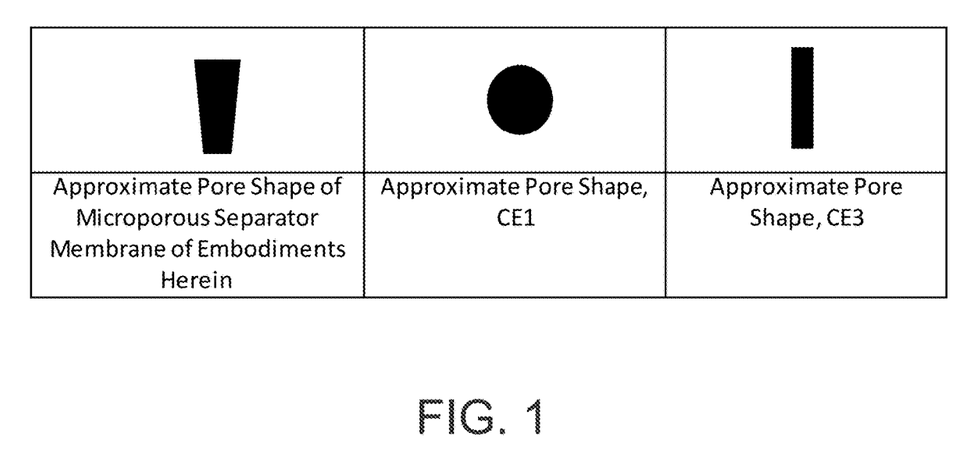
FIG. 1 depicts several approximations of the pore shapes of various microporous separator membranes according to embodiments described herein, compared with approximated pore shapes for comparative CE1 and CE3 microporous separator membranes.

In accordance with selected embodiments, the microporous separator membrane has low electrical resistance (ER) of less than 0.95 ohm-cm², and in some cases, less than 0.8 ohm-cm² combined with low Gurley and low tortuosity. In addition, the microporous separator membrane has a unique morphology as evidenced in scanning electron micrographs (SEMs) shown in FIGS. 9 through 13. The unique porous structure differs from that of known dry process uniaxial and biaxial stretched porous separator membranes (such as the membranes whose SEMs are included in FIGS. 3 through 8). The porous structure of the membrane described in various embodiments herein may resemble a "knitted-like" structure wherein the polymer crystalline lamellae regions resemble small islands connected by a 3-D array of vertically and diagonally elongated fibrillar structures. In addition, in some embodiments, the pores may appear to have a four-sided trapezoid-like shape or a shape that in some ways approximates the shape of a trapezoid. The unique pore shape of the porous structure of these membranes appears to be different from the substantially round-shaped pores of certain known biaxially stretched dry process microporous battery separator membranes, and different from the elongated slit-shaped pores of certain known uniaxially stretched dry process microporous battery separator membranes. Such differences in pore shape are shown, with approximations only, in FIG. 1. The shape of the pores may, in some instances, play an important role in the performance of the microporous battery separator membrane, together with the ER, Gurley, tortuosity and overall porosity of such a microporous battery separator membrane, since the pores provide electrolyte storage and also form a tortuous pathway for the transport of ions between anode and cathode via an electrolyte medium during the charge and discharge cycles in a lithium ion rechargeable battery.

DETAILED DESCRIPTION OF THE INVENTION

Before the present membranes, separators, cells, batteries, methods, and/or the like are disclosed and described, it is to be understood that they are not limited to specific methods, components, particular compositions, or the like. It is also to be understood that the terminology used herein is for the purpose of describing particular embodiments only and is not intended to be limiting.

As used in the specification and the appended claims, the singular forms "a," "an" and "the" include plural referents unless the context clearly dictates otherwise. Ranges may be expressed herein as from "about" one particular value, and/or to "about" another particular value. When such a range is expressed, another embodiment includes from the one particular value and/or to the other particular value. Similarly, when values are expressed as approximations, by use of the antecedent "about," it will be understood that the particular value forms another embodiment. It will be further understood that the endpoints of each of the ranges are significant both in relation to the other endpoint, and independently of the other endpoint.

"Optional" or "optionally" means that the subsequently described event or circumstance may or may not occur, and that the description includes instances where said event or circumstance occurs and instances where it does not. Throughout the description and claims of this specification, the word "comprise" and variations of the word, such as "comprising" and "comprises," means "including but not limited to," and is not intended to exclude, for example, other additives, components, integers or steps. "Exemplary" means "an example of" and is not intended to convey an indication of a preferred or ideal embodiment. "Such as" is not used in a restrictive sense, but for explanatory purposes.

Disclosed are products, shapes, pores, components, materials, layers, or the like that can be used to perform the disclosed characteristics, performance, methods, and systems. These and other components are disclosed herein, and it is understood that when combinations, subsets, interactions, groups, etc. of these components are disclosed that while specific reference of each various individual and collective combinations and permutation of these may not be explicitly disclosed, each is specifically contemplated and described herein, for all products, methods and systems. This applies to all aspects of this application including, but not limited to, steps in disclosed methods. Thus, if there are a variety of additional steps that can be performed it is understood that each of these additional steps can be performed with any specific embodiment or combination of embodiments of the disclosed methods.

In accordance with selected embodiments, the present invention is directed to a microporous membrane which comprises a thermoplastic polymer which can be characterized as semi-crystalline polymer. Such polymers may include polypropylene (PP), polyethylenes (LDPE, LLDPE, HDPE, and UHMWPE), polybutene, poly ethylpentene, co-polymers thereof, and blends or mixtures thereof. The polyolefin can be a homopolymer or a blend of homopolymer polyolefins. The polyolefin can be a co-polymer or a blend of co-polymers of polyolefins. In one embodiment, the preferred polyolefin can be a polypropylene which has a melt flow index (mfi) less than 1.0 g/10 minutes. In another embodiment, the preferred polyolefin can be a polyethylene which has an mfi less than 0.5 g/10 minutes.

The microporous membrane of the present invention may be a single-ply or multi-ply microporous membrane. In general, in accordance with selected embodiments, the process for making the inventive microporous membrane may include the steps of extruding a blown film nonporous precursor in the form of a bubble using an annular die and flattening this tubular bubble membrane to form a "collapsed bubble" nonporous membrane as described in U.S. Pat. No. 5,952,120 and in U.S. Patent Publication No. 2007/0148538. In accordance with at least selected embodiments, the nonporous precursor may be a collapsed bubble polypropylene (PP) membrane. In accordance other embodiments, the nonporous precursor is a multi-ply precursor membrane comprising two outer plies of polypropylene (PP) precursor sandwiching a center ply of polyethylene (PE) precursor which form a stacked precursor membrane with a PP/PE/PP configuration. In some embodiments, such a multi-ply precursor membrane is formed via lamination of the PP/PE/PP precursor membranes together. In other embodiments, the nonporous precursor is a multi-ply precursor membrane that is produced by co-extruding polypropylene (PP)/polyethylene (PE)/polypropylene (PP) to form a nonporous trilayer precursor membrane with a PR/PEW configuration and collapsing the PP/PE/PP trilayer precursor bubble to form a multi-ply PP/PE/PP precursor membrane.

A nonporous monolayer or multilayer precursor membrane can be annealed to increase the amount and size of the crystalline lamellae in the precursor membrane in order to increase the percent crystallinity of the precursor membrane.

In one embodiment of the separator membrane described herein, the nonporous coextruded PP/PE/PP or laminated stacked PP/PE/PP precursor membrane is initially stretched in the machine direction (MID). The amount of MD stretching can be selected or optimized to produce a semi-porous intermediate membrane with high transverse direction (TD) percent elongation, preferably greater than about 600%. Such a semi-porous intermediate membrane having a high percent TD elongation may play a role in achieving the desired amount of TD stretching in a subsequent transverse stretching process step. Furthermore, the amount of MD stretch performed on the nonporous precursor can be optimized to produce a certain percent porosity in semi-porous intermediate membrane, preferably 20 to 50% porosity, in some embodiments, about 30 to 50% porosity. In addition, the amount of MD stretch performed on the nonporous precursor membrane can be optimized to produce a semi-porous intermediate membrane with excellent puncture strength greater than 330 gf.

Following the MD stretching process step, the semi-porous intermediate membrane can be transverse stretched, preferably using 15-400% stretch ratio, in some embodiments, 20-250% stretch ratio, more preferably 25-100% stretch ratio, where the stretch ratio is defined as the "difference of the (final width of the membrane–the initial width of the membrane) divided by the initial width of the membrane". TD stretching can be performed preferably at a temperature of 100-130 T where the line speed is 25-250 ft./minute, in some cases, 50-200 ft./minute, and in some cases, 50-100 ft./minute.

Following the TD stretching process step, the microporous trilayer separator membrane can be transverse direction (TD) relaxed preferably at 10-50% and more preferably at 20-40%. ID relax can be performed at a temperature of preferably 120-140° C.

Following the TD relax process step, the microporous trilayer separator membrane can be heat treated to stabilize the membrane preferably at a temperature of 60° C. to 100° C. for preferably 8 hours to 2 to 3 days.

Figure 2:
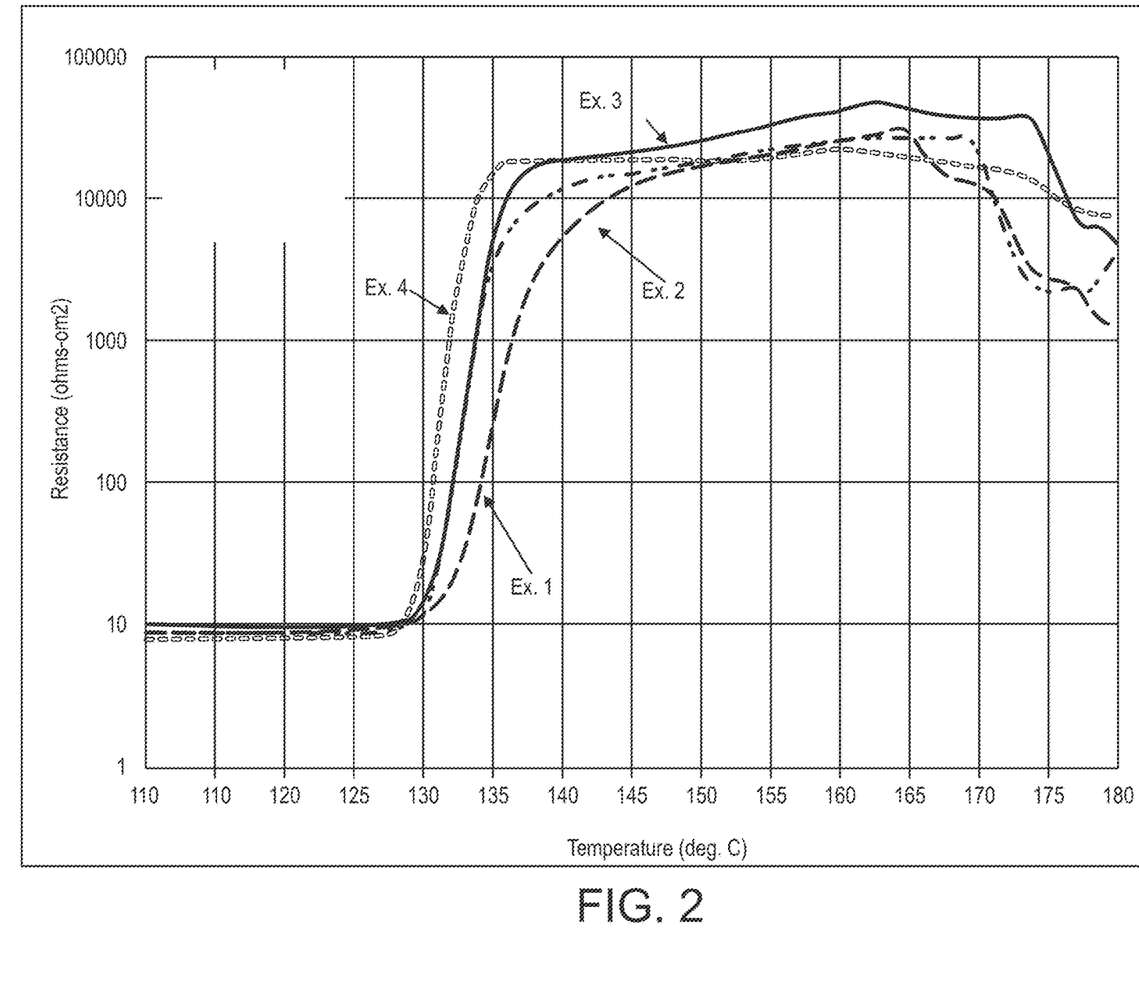
FIG. 2 includes a plot of electrical resistance (ER) as a function of temperature for various trilayer microporous battery separator membranes formed as part of Examples 1-4.
Figure 3:
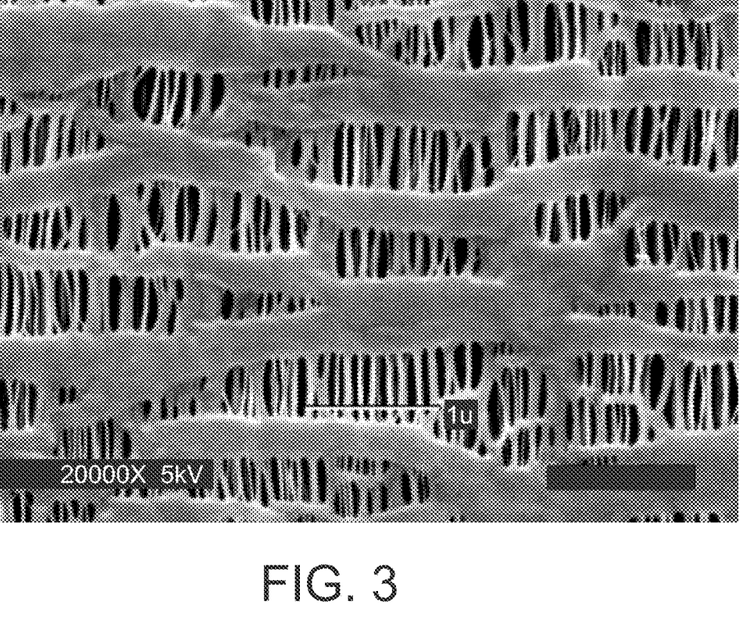
FIG. 3 includes a Scanning Electron Micrograph (SEM) image, at 20,000× magnification, of the surface of a commercially available microporous monolayer polypropylene separator membrane known as Celgard® 2500, which is about 25 microns thick.
Figure 4:
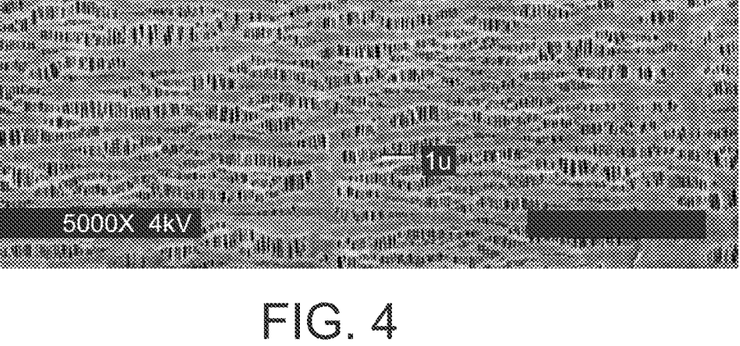
FIG. 4 includes an SEM image, at 5,000× magnification, of the surface of a commercially available Celgard® 2500 separator membrane.
Figure 5:
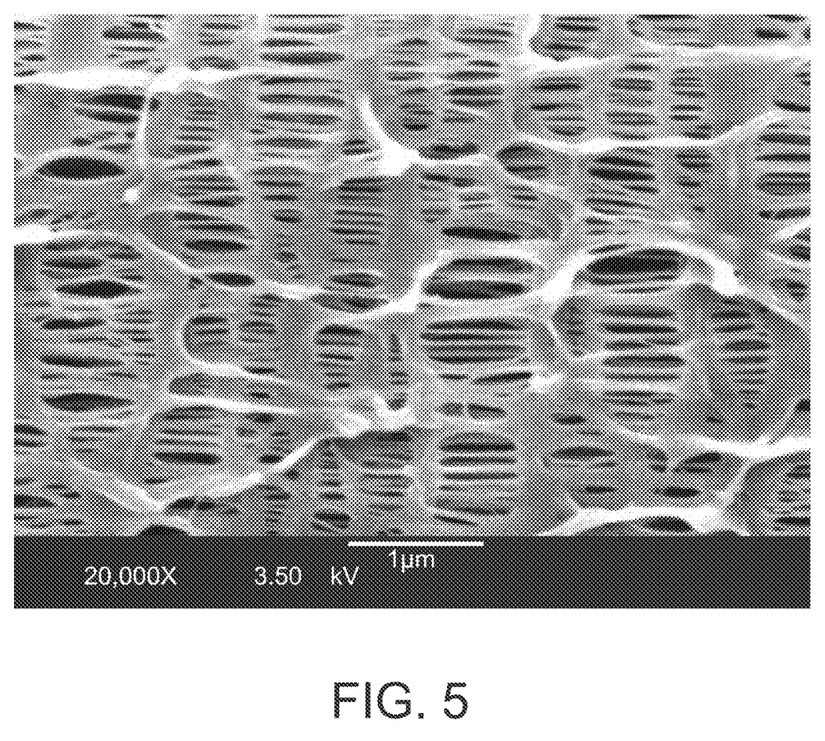
FIG. 5 includes an SEM image, at 20,000× magnification, of the cross section of a commercially available Celgard® 2500 separator membrane.
Figure 6:
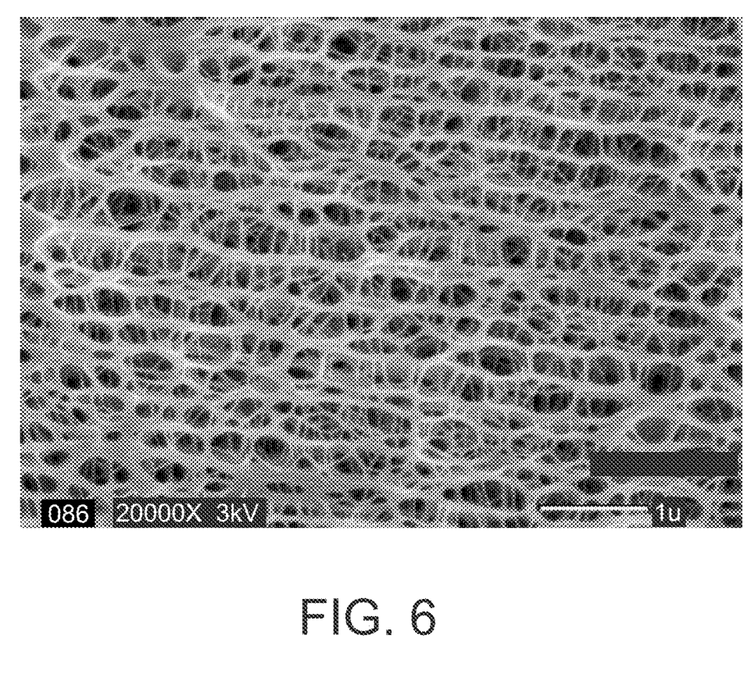
FIG. 6 includes an SEM image, at 20,000× magnification, of the surface of the microporous monolayer polypropylene separator membrane made in accordance with CE1 (Comparative Example 1) herein.

The microporous PP/PE/PP battery separator membrane has a thermal shutdown function due to the inner PE layer. Thermal shutdown is determined by measuring the impedance while the temperature is linearly increased. Thermal shutdown is defined as the temperature at which the impedance or the electrical resistance (ER) increases thousand-fold. A thousand-fold increase in impedance may be needed for a battery separator membrane to stop thermal runaway in a lithium ion battery. The rise in impedance corresponds to a collapse in the pore structure due to the melting of the separator. During thermal shutdown, the pores of the inner PE layer of the possibly preferred inventive separator membrane can coalesce and close at a temperature of 130-135° C. causing the thousand-fold increase in impedance shown in FIG. 2.

Thermal shutdown be affected by several separator parameters such as ER, Gurley, pore size, tortuosity, and/or porosity. A balance of these parameters can play an important role in achieving a low onset temperature of thermal shutdown.

The excellent onset temperature of thermal shutdown of the possibly preferred inventive microporous membranes is achieved, in some embodiments, by controlling the increase in pore size which occurs during transverse stretching. Transverse stretching of the semi-porous intermediate membrane can be used to produce a pore size in the range of 0.03-0.08 μm, in some cases, 0.04-0.06 μm in the polypropylene layers in the trilayer membrane, which is larger than the typical pore size of uniaxial dry stretched polypropylene layers in a known multilayer PP/PE/PP microporous membrane. By controlling the pore size reached during the transverse stretching step, the process for the possibly preferred inventive membrane produces a microporous multilayer separator membrane with a combination of a low ER less than 0.95 ohm-cm2, in some cases, even less (e.g., less than 0.9, less than 0.8, less than 0.7, less than 0.6, and so forth), a low Gurley less than 150 seconds/100 cc and a low tortuosity of less than 1.2.

In another embodiment of making a separator membrane according to various embodiments herein, the nonporous monolayer polypropylene precursor membrane is initially machine direction (MD) stretched to produce a "semi-porous intermediate" membrane. The amount of MD stretching is preferably selected to produce a "semi-porous intermediate" membrane with high transverse direction (TD) percent elongation, preferably greater than 600%. Furthermore, the amount of MD stretch is optimized to produce a "semi-porous intermediate" membrane with a certain porosity, preferably 20-50%, and in some cases, 30-50%. In addition, the amount of MD stretch is optimized to produce a "semi-porous intermediate" membrane, here a monolayer membrane, with good puncture strength greater than 350 gf.

Following the MD stretch step, the monolayer porous membrane is transverse stretched preferably using 15-400% stretch ratio, in some cases, 20-250% stretch ration, and in still some cases, 25-100% stretch ratio where the stretch ratio is defined as the "(final width of the membrane–the initial width of the membrane) divided by the initial width of the membrane". TD stretching is performed preferably at a temperature of 100-130° C. at a speed of preferably 25-250 ft/minute, in some cases, 50-200 ft./minute, and in some cases, 50-100 ft./minute.

Following TD stretching, the microporous monolayer separator membrane can be Transverse direction (TD) relaxed preferably at 10-50% ID relax and more preferably at 20-40% TD relax. TD relax temperature is preferably 120-140° C.

Following ID relax, the microporous monolayer separator membrane can be heat treated to stabilize the membrane, preferably at a temperature of 60° C. to 100° C. for preferably 8 hours to 2 to 3 days.

Furthermore, the inventive monolayer microporous separator membrane has in certain embodiments, an ER of less than 0.95 ohm-cm$^2$ (and in some cases, less than 0.9, or less than 0.85, or less than 0.8, and so forth) and a puncture strength >250 gf. The inventive microporous monolayer battery separator membrane preferably has a combination of low ER, low Gurley and low tortuosity, and at the same time, the pore size has been controlled to be in the range of 0.03-0.08 μm, in some cases, 0.04-0.06 μm, and in some cases 0.050 to 0.060 μm, and the porosity of the inventive monolayer separator membrane to be preferably in the range of 60-70% using TD stretching.

The possibly preferred inventive multilayer and monolayer microporous battery separator membranes have low tortuosity less than 1.3. Tortuosity may be described as a measure of the winding path the ions travel from one surface of the face of a porous membrane, through the pores in the body of the membrane, to the opposite outer face of the membrane. Low tortuosity facilitates more movement or quicker movement of ions and electrolyte through a porous battery separator membrane (compared with high tortuosity) during the charge and discharge cycles of a lithium ion battery. In some instances, a low tortuosity membrane can contribute to a lithium ion battery having a higher rate of cycling and an improved cycle life performance. During the charge cycle of a lithium rechargeable battery, which may have carbon based or lithium metal anodes, lithium ions are transported from the cathode via the electrolyte medium through the pores of the separator membrane to the anode of the battery. The opposite occurs during discharge cycle where lithium ions move from the anode to the cathode. With continuous charge and discharge cycling, a low tortuosity membrane may, in some instances, increase the rate of cycling, electrode utilization and electrode cycling which may, in some instances, improve the cycle life performance of a lithium rechargeable battery.

EXAMPLES

In the following Tables 1 to 4, separator membrane property data is listed for examples produced using the foregoing described process. Table 1 lists two key properties of a semi-porous trilayer (PP/PE/PP) intermediate produced after an initial MD stretch process step in which MD stretching is conducted to produce a semi-porous trilayer (PP/PE/PP) intermediate membrane where the percent TD elongation is greater than 600% and a puncture strength of the semi-porous intermediate membrane is greater than 330 gf.

TABLE 1

| Property | Value |
| --- | --- |
| % TD Elongation of semi-porous trilayer (PP/PE/PP) intermediate | >600 |
| Puncture strength of semi-porous trilayer (PP/PE/PP) intermediate, gf | >330 |

TABLE 2

| | Ex. 1 | Ex. 2 | Ex. 3 | Ex. 4 | CE 2 | CE 3 | CE 4 |
| --- | --- | --- | --- | --- | --- | --- | --- |
| Thickness, μm | 16 | 16 | 17 | 16 | 17.2 | 16 | 16 |
| Gurley (JIS), sec/100 cc | 30 | 60 | 100 | 150 | 500 | 460 | 460 |
| Porosity, % | 63 | 56 | 50 | 48 | 49 | 35 | 39 |
| ER, ohm-cm$^2$ | 0.30 | 0.45 | 0.57 | 0.47 | 0.50 | 1.9 | 2.1 |

TABLE 2-continued

| | Ex. 1 | Ex. 2 | Ex. 3 | Ex. 4 | CE 2 | CE 3 | CE 4 |
|---|---|---|---|---|---|---|---|
| Tortuosity | 1.0 | 1.2 | 1.2 | 1.1 | na | 1.9 | >1.9 |
| PP pore size, µm | 0.051 | 0.049 | 0.048 | 0.046 | 0.065 | 0.032 | 0.026 |
| Pore Shape | trapezoid-like or approximating a shape like a trapezoid | | | | Round or substantially round | Elongated rectangular slit | Elongated rectangular slit |
| Shutdown Onset Temperature, ° C. | 127.5 | 130 | 129 | 131 | 130 | 129 | 130 |
| MD tensile strength, kg/cm² | 1200 | 1500 | 1743 | 1900 | 646 | 1700 | 2100 |
| TD tensile strength, kg/cm² | 200 | 170-180 | 160 | 150 | 730 | 160 | 150 |
| % MD elongation | 41 | 45 | 47 | 42 | na | na | 40-50 |
| % TD elongation | 335 | 533 | 711 | 760 | na | 100 | 300 |
| Puncture Strength, gf | 250 | 280 | 320 | 350 | 364 | >250 | 280 |
| Mixed Penetration | −60% | −42% | −40% | −35% | na | −30% | −25% |

Table 2 lists separator property and performance data on Inventive Example 1, Example 2, Example 3 and Example 4 (all four trilayer separator membranes made according to the processes described herein) together with Comparative example CE 2, Comparative example CE 3 and Comparative example CE 4. CE 2 is a biaxial MD/TD stretched dry process microporous trilayer microporous membrane. Comparative example CE 3 is a uniaxial MD stretched dry process laminated trilayer microporous membrane, and Comparative example CE 4 is a uniaxial MD stretched dry process co-extruded trilayer microporous membrane.

Figure 7:
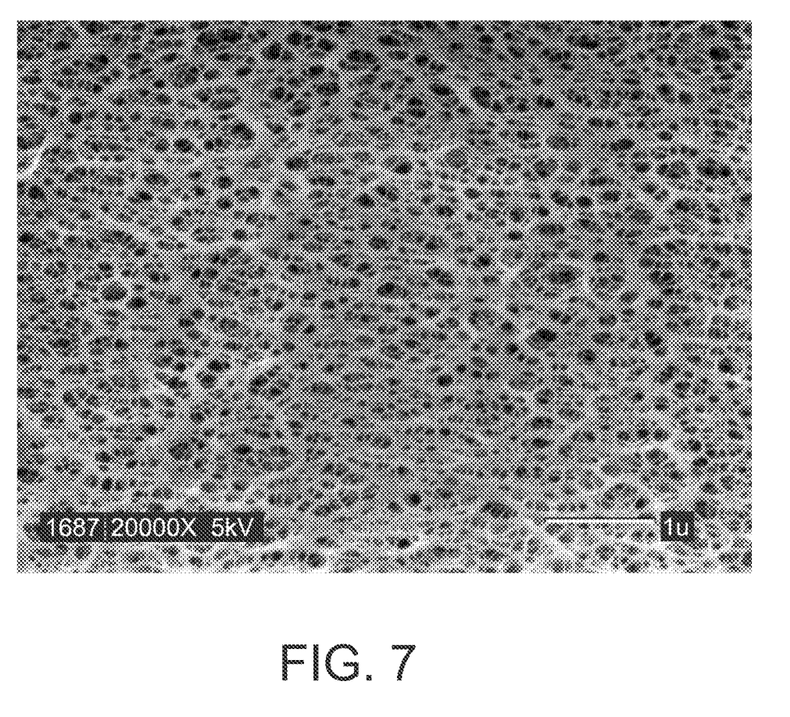
FIG. 7 includes an SEM image, at 20,000× magnification, of the surface of the microporous trilayer PP/PE/PP separator membrane made in accordance with CE2 (Comparative Example 2) herein.
Figure 8:
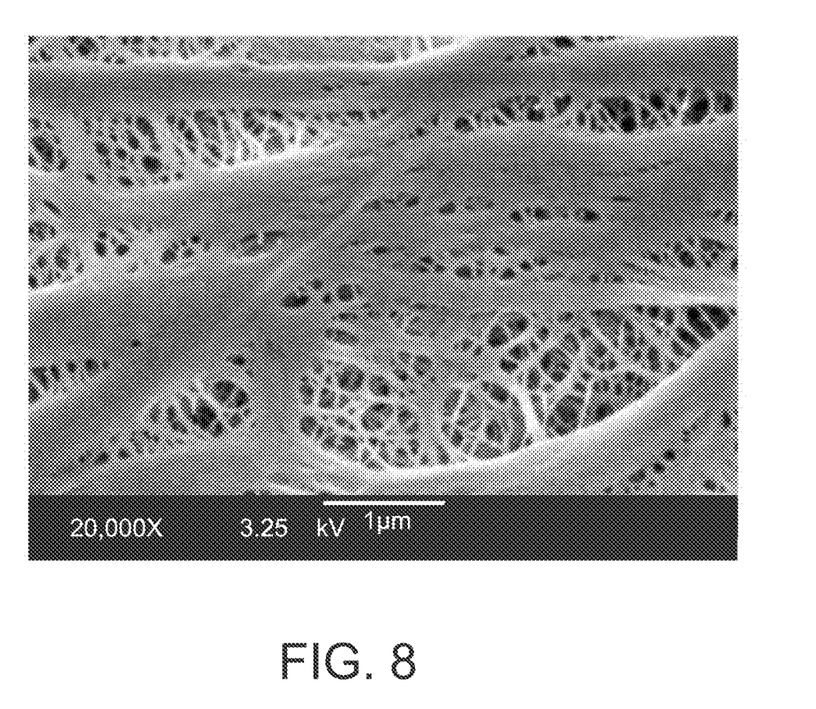
FIG. 8 includes an SEM image, at 20,000× magnification, of the surface of the microporous monolayer polypropylene separator membrane made in accordance with CE5 (Comparative Example 5) herein.
Figure 9:
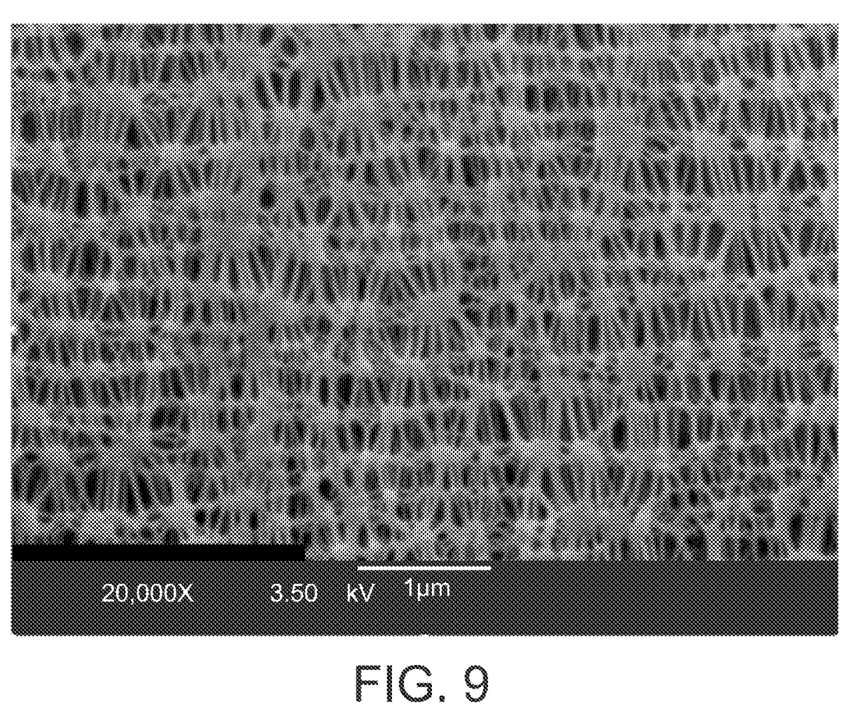
FIG. 9 includes an SEM image, at 20,000× magnification, of the surface of the microporous PP/PE/PP separator membrane made in accordance with Example 2.
Figure 10:
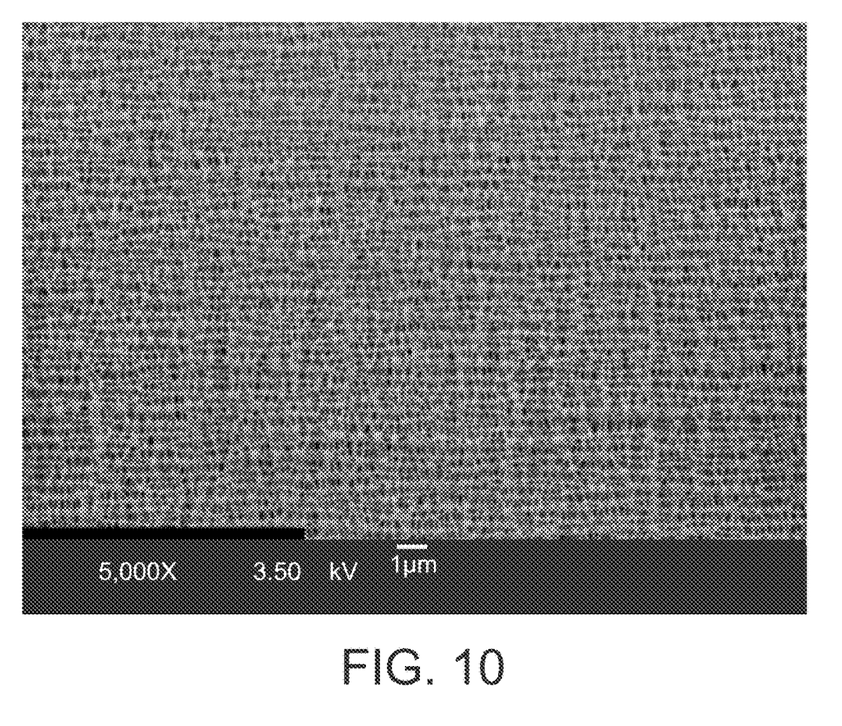
FIG. 10 includes an SEM image, at 5,000× magnification, of the surface of the microporous PP/PE/PP separator membrane made in accordance with Example 2.
Figure 11:
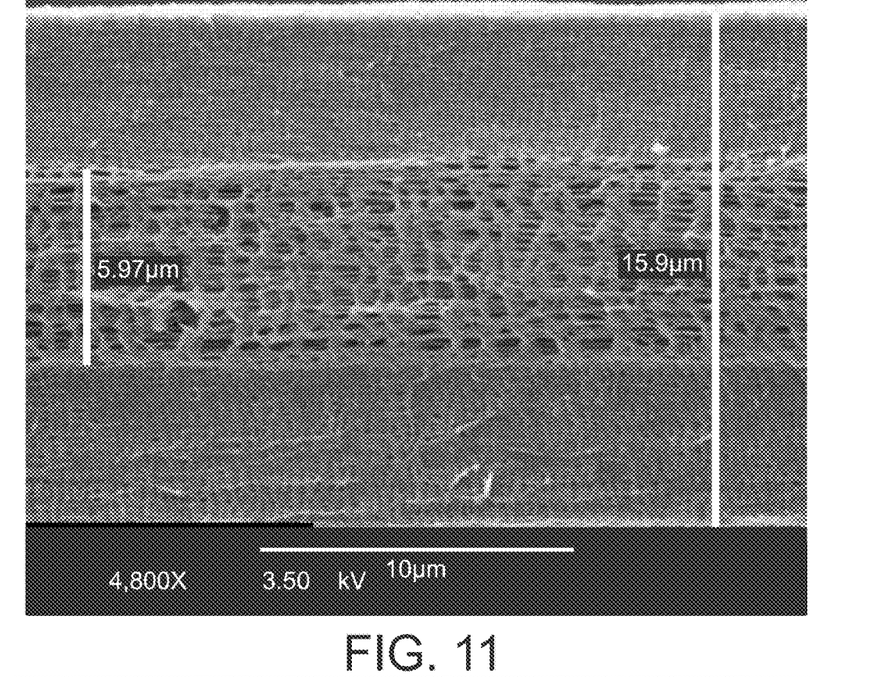
FIG. 11 includes an SEM image, at 4,800× magnification, of the cross section of the microporous PP/PE/PP separator membrane made in accordance with Example 2.

In accordance with selected embodiments shown in these Examples, the inventive trilayer microporous separator membrane has very low electrical resistance (ER) of 0.57 ohm-cm² or less, a low Gurley of 150 sec/100 cc or less, and a low tortuosity of 1.2 or less. CE 2 is a biaxial stretched trilayer microporous membrane with low ER but it has a high Gurley and much lower MD tensile strength both of which are separator properties which can affect battery cycle performance. The inventive separator membrane has significantly improved lower ER, lower tortuosity and lower Gurley than CE 3 and CE 4 which are porous membranes made without any transverse direction stretching. The uniqueness of the inventive separator membrane is demonstrated by its novel morphology as evidenced by Scanning Electron Micrograph (SEM) analysis. FIG. 9 shows an SEM image of the inventive Ex. 2 which has unique pore shape that is different from the pore shape of known dry process biaxial stretched porous separator membranes (such as the membrane shown in FIG. 7). The porous structure of the inventive membrane resembles a "knitted-like" structure where the polymer crystalline lamellae regions resemble small islands connected by a 3-D array of vertically and diagonally elongated fibrillar structures. The pores of the separator membrane of Ex. 2, shown in FIGS. 9 and 10, have a non-rounded shape and may be described as having approximately a four sided geometric shape which is similar to an isosceles trapezoid or a pore shape that is trapezoid-like in appearance. This novel shaped pore may, in certain instances, provide various advantages to one or more separators when compared to other battery separator membranes such as 1) other known biaxial direction stretched dry process microporous battery separator membranes which may have a round-shaped or substantially round-shaped pore as shown in FIG. 7, and/or 2) other known uniaxial direction stretched dry process microporous battery separator membranes shown in FIGS. 3, 4 and 5.

The excellent onset of thermal shutdown of the possibly preferred inventive trilayer microporous membrane may be achieved by controlling the increase in pore size which occurs during transverse stretching. Transverse stretching of the semi-porous intermediate inventive membrane produced polypropylene layers in the trilayer membrane with a pore size of 0.046 to 0.051 µm, which is shown to be larger than the typical pore size of various uniaxial stretched polypropylene layers in multilayer CE 3 and CE 4 microporous membranes. In addition to smaller PP pore sizes, the possibly preferred inventive microporous separator membrane has a combination of a very low ER, in some cases, less than 0.57 ohm-cm², a low Gurley, in some cases, less than 150 seconds/100 cc in combination with a low tortuosity, in some cases of less than 1.2.

Table 3 lists two properties of the semi-porous monolayer intermediate produced in the initial MD stretch process step in which MD stretching is conducted to produce a semi-porous intermediate membrane where the percent TD elongation is greater than 600% and a puncture strength of the semi-porous intermediate membrane is greater than 350 gf.

TABLE 3

| Property | Value |
|---|---|
| % TD Elongation of monolayer semi-porous intermediate | >600 |
| Puncture strength of monolayer semi-porous intermediate, gf | >350 |

Table 4 lists separator property and performance data on Inventive Example 5, Example 6 and Example 7, all of which are monolayer polypropylene separator membranes made in accordance with the processes described herein, together with Comparative example CE 1, Comparative example CE 5 and Comparative example CE 6. Comparative example CE 1 is a monolayer biaxial stretched microporous separator membrane, Comparative example CE 5 is a beta nucleated monolayer biaxial stretched microporous separator membrane, and Comparative example CE 6 is a monolayer uniaxial MD stretched microporous separator membrane.

TABLE 4

| | Ex. 5 | Ex. 6 | Ex. 7 | CE 1 | CE 5 | CE 6 |
|---|---|---|---|---|---|---|
| Thickness, μm | 25 | 24 | 23 | 15 | 30 | 25 |
| Gurley (JIS), sec/100 cc | 120 | 90 | 50 | 500 | 370 | 200 |
| Porosity, % | 60 | 62 | 68 | 69 | 61 | 41 |
| ER, ohm-cm$^2$ | 0.77 | 0.70 | 0.63 | 0.50 | 2.0 | 1.5 |
| Tortuosity | 1.3 | 1.3 | 1.3 | 1.4 | 2.1 | 1.7 |
| PP pore size, μm | 0.050 | 0.055 | 0.060 | 0.065 | 0.060 | 0.043 |
| Shutdown Onset Temperature, ° C. | 164 | 166 | 168 | >150 | >165 | >165 |
| MD tensile strength, kg/cm$^2$ | 1200 | 1100 | 1000 | 800 | 850 | 1420 |
| TD tensile strength, kg/cm$^2$ | 130 | 160 | 180 | 500 | 648 | 140 |
| Puncture Strength, g | 320 | 250 | 260 | 230 | >400 | >450 |

In accordance with selected embodiments, the inventive monolayer microporous separator membrane has very low electrical resistance (ER) of 0.77 ohm-cm$^2$ or less, and low Gurley of 120 seconds/100 cc or less in combination with low tortuosity of about 1.3 or less.

Inventive Example 5, Inventive Example 6 and Inventive Example 7 have a Gurley of 120 sec/100 cc or less which is significantly lower than CE 1, CE 5 and CE 6. The biaxial stretched CE 5 has a larger pore size and higher tortuosity when compared to the inventive membrane but has higher ER. The uniaxial stretched CE 6 has higher tortuosity and comparative pore size but has much higher ER. CE 1 has comparative ER to the inventive membrane, however, this is at the expense of higher Gurley and much lower machine direction tensile strength.

Figure 12:
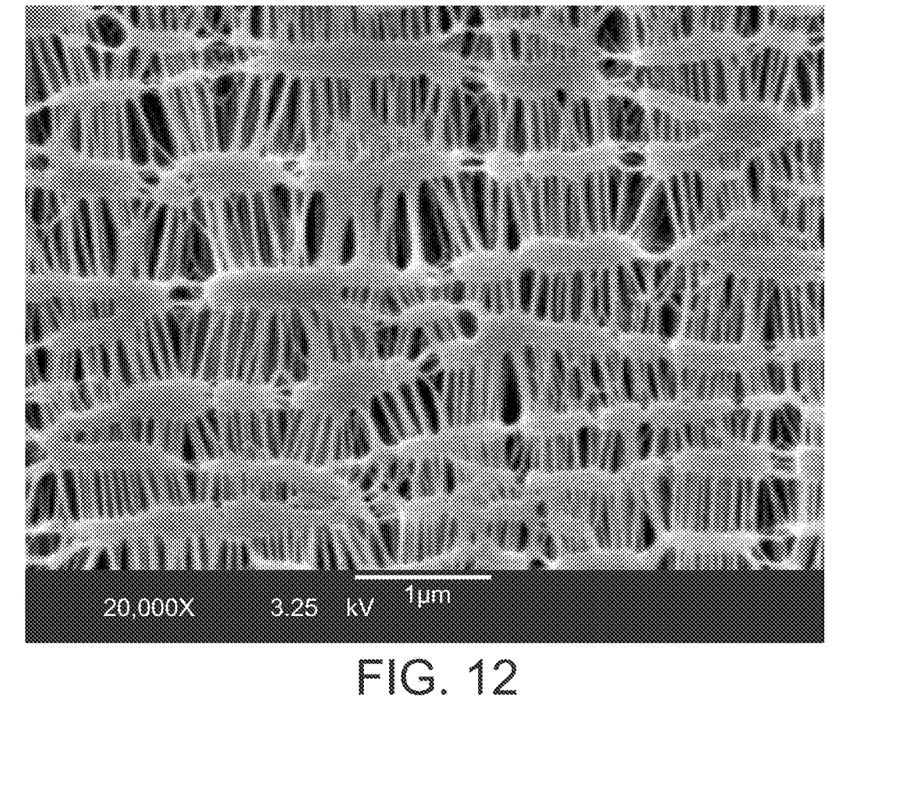
FIG. 12 includes an SEM image, at 20,000× magnification, of the surface of the microporous monolayer PP separator membrane made in accordance with Example 6.
Figure 13:
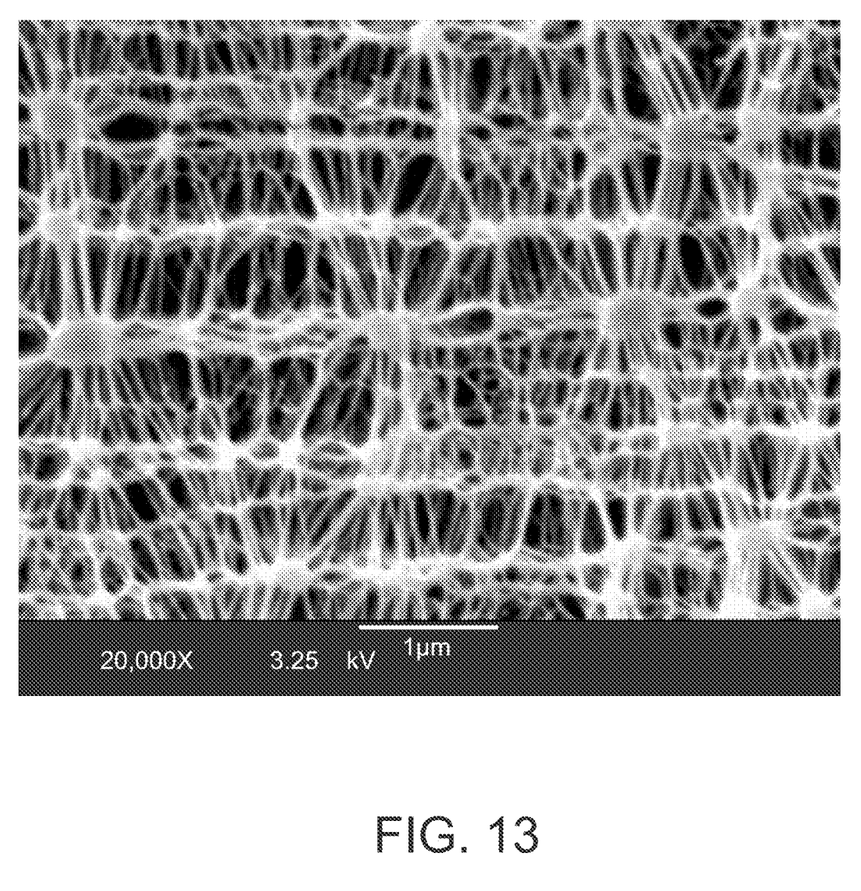
FIG. 13 includes an SEM image, at 20,000× magnification, of the surface of the microporous monolayer PP separator membrane made in accordance with Example 7.

The synergistic combination of low ER, low Gurley and low tortuosity in the inventive monolayer separator membrane may be attributable to the porous structure which resembles the same "knitted-like" structure of the inventive trilayer membrane discussed in various embodiments above where the polymer crystalline lamellae regions resemble small islands connected by a 3-D array of vertically and diagonally elongated fibrillar structures as the inventive trilayer separator membrane. The inventive monolayer membrane also has a unique morphology as evidenced in Scanning Electron Micrograph (SEM) analysis. The SEM images of the surface of the inventive monolayer Ex. 6 and Ex. 7 are shown in FIGS. 12 and 13, respectively. The pores of the inventive monolayer microporous membrane have the same non-round pore shape as the inventive trilayer microporous membrane. The inventive monolayer microporous membrane has a pore shape which is different from 1) various known dry process uniaxial stretched monolayer porous separator membranes (such as the one shown in FIG. 6) which has the elongated slit-shaped pore typical of uniaxial Celgard® dry process battery separator membranes, and 2) the prior art dry process beta-nucleated biaxial stretched porous separator membranes shown in FIG. 8 which has vein-like porous structure with a thick, intertwined lamellar fibrous structure typical of a beta-nucleated polypropylene porous membrane.

The excellent onset of thermal shutdown of the inventive monolayer microporous membrane is achieved by controlling the increase in pore size which occurs during transverse stretching process step. Transverse stretching of the inventive monolayer membrane which followed the MD stretching of the semi-porous intermediate membrane can produce pore size of 0.050 to 0.060 μm which are smaller than that of the biaxial stretched CE 1. Smaller pore size can contribute to effective closure of the pores at thermal shutdown and a faster rate of thermal shutdown.

The inventive battery separator membrane may provide a means to achieve an improved level of battery performance in a rechargeable or secondary lithium battery based on a synergistic combination of low electrical resistance with low Gurley, low tortuosity and a unique non-round trapezoid (interior angles less than 90 degrees) shaped pore.

The present invention may be embodied in other forms without departing from the spirit and the essential attributes thereof, and, accordingly, reference should be made to the appended claims, rather than to the foregoing specification, as indicating the scope of the invention. Additionally, the invention illustratively disclosed herein suitably may be practiced in the absence of any element which is not specifically disclosed herein.

Test Methods

Thickness

Thickness is measured using the Emveco Microgage 210-A precision micrometer thickness tester according to test procedure ASTM D374. Thickness values are reported in units of micrometers, μm.

Gurley

Gurley is defined as the Japanese Industrial Standard (JIS Gurley) JIS P8117 and is an air permeability test measured using the OHKEN permeability tester. JIS Gurley is the time in seconds required for 100 cc of air to pass through one square inch of film at constant pressure of 4.8 inches of water.

Puncture Strength

Test samples are first pre-conditioned to 73.4 deg C. and a relative humidity of 50% for a minimum of 20 minutes. An Instron Model 4442 is used to measure puncture strength of test sample. Thirty measurements are made across the diagonal direction of a 1¼"×40" continuous sample specimen and averaged. The needle has a 0.5 mm radius. The rate of descent is 25 mm/min. The film is held tight in a clamping device which utilizes an O-ring to securely hold the test sample in place. The diameter of this secured area is 25 mm. The displacement (in mm) of the film that was pierced by the needle is recorded against the resistance force (in gram force) developed by the tested film. The maximum resistance force is the puncture strength in units of gram force (gf). A load-versus-displacement plot is produced by this test method.

Pore Size

Pore size is measured using the Aquapore Porosimeter available through Porous Materials, Inc. (PMI). Pore size is expressed in μm.

Porosity

The porosity of a microporous film sample is measured using ASTM method D-2873 and is defined as the percent void spaces in a microporous membrane.

TD and MD Tensile Strength

The tensile strength along the MD and TD is measured using Instron Model 4201 according to ASTM D-882 method.

Electrical Resistance (ER) (Also Known as Ionic Resistance, IR)

Electrical Resistance is defined as the Resistance value in ohm-cm2 of a separator filled with electrolyte. The units of electrical resistance are ohm-cm$^2$. The separator resistance is characterized by cutting small pieces of separators from the finished material and then placing them between two blocking electrodes. The separators are saturated with the battery electrolyte with 1.0 M LiPF$_6$ salt in EC/EMC solvent of 3:7 ratio by volume. The Resistance, R, in Ohms ($\Omega$), of the separator is measured by a 4-probe AC impedance technique. In order to reduce the measurement error on the electrode/separator interface, multiple measurements are needed by adding more layers. Based on the multiple layer measurements, the electric (ionic) resistance, R$_s$ ($\Omega$), of the separator saturated with electrolyte is then calculated by the formula R$_s$=p$_s$l/A where p$_s$ is the ionic resistivity of the separator in $\Omega$-cm, A is the electrode area in cm$^2$ and l is the thickness of the separator in cm. The ratio p$_s$/A=is the slope calculated for the variation of the separator resistance ($\Delta$R) with multiple layers ($\Delta\delta$) which is given by slope=p$_s$/A=$\Delta$R/$\Delta\delta$.

Hot Electrical Resistance (ER)

Hot Electrical Resistance is a measure of resistance of a separator film under 50 lb pressure while the temperature is linearly increased at a rate of 60° C./minute. A ⅜" diameter piece of separator is saturated with electrolyte and sandwiched between two electrode discs made of Al or Cu. The rise in resistance, measured as Impedance, corresponds to a collapse in pore structure due to melting or "shutdown" of the separator Membrane. When a separator membrane has sustained high level of electrical resistance at elevated temperatures, this is indicative that the separator membrane may prevent electrode shorting in a battery.

Mixed Penetration

Mixed Penetration is the force required to create a short through a separator when placed between cathode and anode materials. This test is used to indicate the tendency of a separator to allow short circuits during the battery assembly. Details of this method are described in US 2010/209758.

Dielectric Breakdown (DB)

Dielectric breakdown (DB) is the measurement of the electrical insulation property of a separator. Voltage is applied to a separator membrane at a ramp rate of 6,000V/sec until the dielectric breakdown of the sample is observed. High DB is indicative that the separator will have good winding yields and low HiPot failure rate.

Tortuosity

Tortuosity, $\tau$, is calculated using the following formula where A is the membrane area in cm$^2$, R is membrane resistance in ohm cm ($\Omega$ cm), $\varepsilon$ is the percent porosity, L is the thickness of the membrane and $\zeta$ is the electrolyte resistance in Ohm cm ($\Omega$ cm):

$$\tau^2 = A \times R \times \varepsilon / (L \times \zeta)$$

In accordance with at least selected embodiments, aspects or objects, the present application or invention is directed to novel or improved microporous battery separator membranes, separators, cells, or batteries including such membranes or separators, and/or methods including methods of making such membranes, separators, cells, and/or batteries, and/or methods of using such membranes, separators, cells, and/or batteries. In accordance with at least certain embodiments, the present invention is directed to a battery separator for a secondary or rechargeable lithium battery which may have low electrical resistance of less than 0.95 ohm-cm$^2$, in some cases, less than 0.8 ohm-cm$^2$. In accordance with at least certain embodiments, the battery separator membrane or separator may provide a means to achieve an improved level of battery performance in a rechargeable or secondary lithium battery based on a possibly synergistic combination of low electrical resistance, low Gurley, low tortuosity, and/or a unique shaped pore, which pore, in some cases, approximates the shape of a trapezoid or is trapezoid-like in shape. In accordance with at least certain multilayer embodiments (by way of example only, a trilayer membrane made of two polypropylene layers with a polyethylene layer in between), the microporous membrane or battery separator described herein may have excellent onset of thermal shutdown and/or excellent rate of thermal shutdown performance.

In accordance with at least certain embodiments, aspects or objects, there are provided novel or improved microporous battery separator membranes, separators, cells, batteries including such membranes, separators, or cells, and/or methods of making such membranes and/or separators, and/or methods of using such membranes and/or separators. In accordance with at least certain embodiments, an improved or novel battery separator for a secondary or rechargeable lithium battery may have low Electrical resistance of less than 0.95 ohm-cm$^2$, in some cases, less than 0.8 ohm-cm$^2$. Furthermore, the inventive battery separator membrane may provide a means to achieve an improved level of battery performance in a rechargeable or secondary lithium battery based on a possibly synergistic combination of low Electrical resistance, low Gurley, low tortuosity, and/or a unique trapezoid shaped pore. In accordance with at least certain multilayer embodiments (by way of example only, a trilayer membrane made of two polypropylene layers with a polyethylene layer in between), the inventive microporous membrane or battery separator may have excellent onset and rate of thermal shutdown performance which may be achieved by controlling an increase in pore size using transverse stretching.

In accordance with at least certain embodiments, aspects or objects, the present disclosure or invention may address the above needs, issues, problems, or desires for better or enhanced power performance of various lithium batteries, such as secondary or rechargeable lithium ion batteries, may be influenced by the ER, the Gurley and/or the tortuosity of the battery separator used in such a battery. There is a need for a microporous separator membrane with very low ER, low Gurley and low tortuosity in order to increase the power, improve the rate performance, improve the cycling performance, improve the cycle life, and/or improve performance after a high number of charge/discharge cycles of a lithium ion rechargeable battery. In some instances, an improved separator having a very low ER, low Gurley, and low tortuosity may provide a separator having lower ionic resistance to the flow of electrolyte during battery cycling, which may contribute to various improvements in performance for a battery containing such an improved separator. Electric Drive Vehicles (EDVs) often require a high power performance battery. One method of achieving higher power performance in a lithium ion battery for EDV end use applications is to use a very low ER, microporous separator membrane with low Gurley and low tortuosity in a lithium ion rechargeable battery.

In accordance with certain embodiments, there are provided novel or improved microporous battery separator membranes, separators, cells, batteries, and/or a novel, improved or modified polyolefin battery separator membrane, comprising:

a microporous separator membrane having an electrical resistance less than 0.95 ohm-cm$^2$ or less than 0.8 ohm-cm$^2$, a microporous separator membrane having a Gurley less than 150 sec/100 cc, a microporous separator membrane having a tortuosity less than 1.3, wherein said microporous polyolefin separator membrane has a non-round, trapezoid shape pore, and/or where said improved and modified microporous polyolefin separator membrane consists of a polypropylene, polyethylene, mixtures thereof, and co-polymers thereof, where said improved and modified microporous polyolefin separator membrane can be a monolayer membrane, where said improved and modified microporous polyolefin separator membrane can be a multilayer membrane with a thermal shutdown function, where said improved and modified microporous polyolefin separator membrane can be a multilayer membrane consisting of a trilayer of polypropylene/polyethylene/polyethylene, wherein the said improved and modified microporous polyolefin separator membrane has a thickness less than 25 µm, and/or wherein the said improved and modified microporous polyolefin separator membrane has pores with a non-round, trapezoid shape, and/or a novel, improved or modified polyolefin battery separator membrane made by a process comprising:

extruding a polypropylene which has a melt flow index less than 1.0 g/10 minutes to form a monolayer nonporous precursor membrane and, machine direction stretching a nonporous polypropylene precursor membrane to form a semi-porous intermediate membrane having a puncture strength >350 gf and TD elongation >600%, transverse direction stretching a semi-porous intermediate membrane using a stretch ratio of 15 to 400%, and preferably stretching using a stretch ratio of 25 to 100% to form a microporous separator membrane, and/or formed when said semi-porous intermediate membrane is transverse stretched at a temperature of 100 to 130 deg C., formed wherein said semi-porous intermediate membrane is transverse stretched at a temperature of 100 to 130 deg C. at a speed of 100 ft/minute, and preferably at a speed of 50 ft/minute, wherein membrane is thermally relaxed at 120 to 140 deg C., and/or wherein membrane is heat treated at a temperature of 60 to 100 deg C. for preferably 8 hours to 2 to 3 days, and/or a novel, improved or modified polyolefin trilayer battery separator membrane made by a process comprising:

extruding a polyethylene which has a melt flow index less than 1.0 g/10 minutes to form a monolayer nonporous polyethylene precursor membrane and, extruding a polypropylene which has a melt flow index less than 1.0 g/10 minutes to form a monolayer nonporous polypropylene precursor membrane and, laminating two plies of polypropylene precursor membrane as outer plies (layers) sandwiching one inner ply (layer) of polyethylene precursor membrane to form a trilayer polypropylene/polyethylene/polyethylene nonporous precursor, machine direction stretching a nonporous polypropylene/polyethylene/polyethylene precursor membrane to form a semi-porous intermediate membrane having a puncture strength >350 gf and TD elongation >600%, transverse direction stretching a semi-porous intermediate membrane using a stretch ratio of 15 to 400%, and preferably stretching using a stretch ratio of 25 to 100% to form a microporous trilayer separator membrane, and/or formed when said semi-porous intermediate membrane is transverse stretched at a temperature of 100 to 130 deg C., formed wherein said semi-porous intermediate membrane is transverse stretched at a temperature of 100 to 130 deg C. at a speed of 100 ft/minute, and preferably at a speed of 50 ft/minute, wherein membrane is thermally relaxed at 120 to 140 deg C., and/or wherein membrane is heat treated at a temperature of 60 to 100 deg C. for preferably 8 hours to 2 to 3 days, and/or improved microporous battery separator membranes, separators, cells, or batteries including such membranes, separators, or cells, and/or methods including methods of making such membranes, separators, cells, and/or batteries, and/or methods of using such membranes, separators, cells, and/or batteries, a battery separator for a secondary or rechargeable lithium battery which may have low electrical resistance of less than 0.95 ohm-cm$^2$, in some cases, less than 0.8 ohm-cm$^2$, the battery separator membrane or separator providing a means to achieve an improved level of battery performance in a rechargeable or secondary lithium battery based on a possibly synergistic combination of low electrical resistance, low Gurley, low tortuosity, and/or a unique shaped pore, which pore, in some cases, approximates the shape of a trapezoid or is trapezoid-like in shape, and/or multilayer embodiments (by way of example only, a trilayer membrane made of two polypropylene layers with a polyethylene layer in between), wherein the microporous membrane or battery separator having excellent onset of thermal shutdown and/or excellent rate of thermal shutdown performance as shown or described herein, and/or the like.

Disclosed are novel or improved microporous battery separator membranes, separators, cells, batteries including such membranes, separators, or cells, and/or methods of making such membranes and/or separators, and/or methods of using such membranes and/or separators. In accordance with at least certain embodiments, an improved or novel battery separator for a secondary or rechargeable lithium battery may have low Electrical resistance of less than 0.95 ohm-cm$^2$, or in some cases, less than 0.8 ohm-cm$^2$. Furthermore, the inventive battery separator membrane may provide a means to achieve an improved level of battery performance in a rechargeable or secondary lithium battery based on a possibly synergistic combination of low Electrical resistance, low Gurley, low tortuosity, and/or a unique trapezoid shaped pore. In accordance with at least certain multilayer embodiments (by way of example only, a trilayer membrane made of two polypropylene layers with a polyethylene layer in between), the inventive microporous membrane or battery separator may have excellent onset and rate of thermal shutdown performance.

The scope of the invention is not limited to the above description or examples, or to the attached drawings. The microporous battery separator membranes, separators, cells, batteries including such membranes, separators, or cells, and/or methods of making such membranes and/or separators, and/or methods of using such membranes and/or separators, and/or compositions and methods of the appended claims are not limited in scope by the specific examples, compositions and methods described herein, which are intended as illustrations of a few aspects of the claims and any compositions and methods that are functionally equivalent are intended to fall within the scope of the claims. Various modifications of the products, compositions and methods in addition to those shown and described herein are intended to fall within the scope of the appended claims. Further, while only certain representative products, compositions and method steps disclosed herein are specifically described, other combinations of the components, compositions and method steps also are intended to fall within the scope of the appended claims, even if not specifically recited. Thus, a combination of steps, elements, components, or constituents may be explicitly mentioned herein or less, however, other combinations of steps, elements, components, and constituents are included, even though not explicitly stated. The term "comprising" and variations thereof as used herein is used synonymously with the term "including" and variations thereof and are open, non-limiting terms. Although the terms "comprising" and "including" have been used herein to describe various embodiments, the terms "consisting essentially of" and "consisting of" can be used in place of "comprising" and "including" to provide for more specific embodiments of the invention and are also disclosed. Other than in the examples, or where otherwise noted, all numbers expressing quantities of ingredients, reaction conditions, and so forth used in the specification and claims are to be understood at the very least, and not as an attempt to limit the application of the doctrine of equivalents to the scope of the claims, to be construed in light of the number of significant digits and ordinary rounding approaches. principles, preferred embodiments and examples of operation of the present invention have been described in the foregoing specification. The invention which is intended to be protected herein, however, is not to be construed as limited to the particular forms disclosed, since these are to be regarded as illustrative rather than restrictive. Variations and changes may be made by those skilled in the art without departing from the spirit of the present invention.

We claim:

1. A microporous membrane comprising:
   a dry stretch microporous polyolefin membrane with trapezoid shaped pores, and having:
   a Gurley less than 500 sec/100 cc, and
   an electrical resistance less than 0.95 ohm-cm$^2$.

2. The microporous membrane of claim 1 wherein the dry stretch microporous polyolefin membrane has:
   a Gurley less than 150 sec/100 cc,
   a tortuosity less than 1.3, and/or
   said dry stretch microporous polyolefin membrane consists of a polypropylene, polyethylene, mixtures thereof, or co-polymers thereof.

3. The microporous membrane of claim 1 where said dry stretch microporous polyolefin membrane is a monolayer membrane or a multilayer membrane with a thermal shutdown function.

4. The microporous membrane of claim 1 where said dry stretch microporous polyolefin membrane is a multilayer membrane consisting of a trilayer of polypropylene/polyethylene/polypropylene.

5. The microporous membrane of claim 4, where said trilayer of polypropylene/polyethylene/polypropylene is made by a process comprising:
   extruding a polyethylene which has a melt flow index less than 1.0 g/10 minutes to form a monolayer nonporous polyethylene precursor membrane, and
   extruding a polypropylene which has a melt flow index less than 1.0 g/10 minutes to form a monolayer nonporous polypropylene precursor membrane, and
   laminating two plies of polypropylene precursor membrane as outer plies or layers sandwiching one inner ply or layer of polyethylene precursor membrane to form a trilayer polypropylene/polyethylene/polypropylene nonporous precursor,
   machine direction stretching the trilayer polypropylene/polyethylene/polypropylene nonporous precursor membrane to form a semi-porous intermediate membrane having a puncture strength >350 gf and TD elongation >600%, and
   transverse direction stretching the semi-porous intermediate membrane using a stretch ratio of 15 to 400% to form the trilayer of polypropylene/polyethylene/polypropylene which is microporous.

6. The microporous membrane of claim 5 where said stretch ratio is 25 to 100%.

7. The microporous membrane of claim 1 where said dry stretch microporous polyolefin membrane has a thickness less than 25 µm.

8. The microporous membrane of claim 1, where said dry stretch microporous polyolefin membrane is made by a process comprising:
   extruding a polypropylene which has a melt flow index less than 1.0 g/10 minutes to form a monolayer nonporous polypropylene precursor membrane, and
   machine direction stretching the monolayer nonporous polypropylene precursor membrane to form a semi-porous intermediate membrane having a puncture strength >350 gf and TD elongation >600%, and
   transverse direction stretching the semi-porous intermediate membrane using a stretch ratio of 15 to 400% to form the dry stretch microporous polyolefin membrane of the microporous membrane.

9. The microporous membrane of claim 8 where said stretch ratio is from 25 to 100%.

10. The microporous membrane of claim 1, where said dry stretch microporous polyolefin membrane is a monolayer membrane.

11. The microporous membrane of claim 10, where said dry stretch microporous polyolefin membrane is a polypropylene membrane.

12. A battery separator comprising the microporous membrane of claim 10.

13. A battery separator comprising the microporous membrane of claim 1.

* * * * *